(12) United States Patent
Fotheringham et al.

(10) Patent No.: US 6,374,640 B1
(45) Date of Patent: Apr. 23, 2002

(54) METHOD FOR COMPACTION OF FLAT GLASS PANES

(75) Inventors: Ulrich Fotheringham, Wiesbaden; Dirk Sprenger, Stadecken-Elsheim; Heinrich Ostendarp, Mainz; Holger Wegener, Alfeld; Wolfgang Buergel, Mainz; Eva Hoelzel, Ober-Olm, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/529,137

(22) PCT Filed: Oct. 8, 1998

(86) PCT No.: PCT/EP98/06393

§ 371 Date: Aug. 2, 2000

§ 102(e) Date: Aug. 2, 2000

(87) PCT Pub. No.: WO99/19265

PCT Pub. Date: Apr. 22, 1999

(30) Foreign Application Priority Data

Oct. 10, 1997 (DE) .......................... 197 44 666

(51) Int. Cl.⁷ .................. C03B 32/00; C03B 25/00; C03C 23/00
(52) U.S. Cl. .................. 65/111; 65/30.1; 65/30.13; 65/30.14; 65/117; 65/374.13
(58) Field of Search ............... 65/30.1, 30.13, 65/30.14, 111, 117, 374.13

(56) References Cited

U.S. PATENT DOCUMENTS

| | | |
|---|---|---|
| 5,073,181 A | 12/1991 | Foster |
| 5,597,395 A | 1/1997 | Bocko |
| 5,681,609 A * | 10/1997 | Kitayama et al. ............ 65/30.1 |
| 5,916,656 A * | 6/1999 | Kitayama et al. ........... 65/30.14 |

FOREIGN PATENT DOCUMENTS

| | | |
|---|---|---|
| DE | 891 916 C | 8/1953 |
| DE | 34 22 347 A | 12/1985 |

OTHER PUBLICATIONS

Patent Abstract of Japan 08301628 A, Nov. 19, 1996.
George W. Scherer: "Relaxation in Glass and Composites", John Wiley 7 Sons, Inc. (New York, Chichester, Brisbane, Toronto, Singapore), 1986, lIbrary of Congress Catalog Card No. 85–17871.
T. Yukawa et al: "Recent Progress of Liquid Crystal Display Devices", Science and Technology of New Glasses, Eds.: S. Sakka & N. Soga, pp. 71–82, Tokyo, 1991.
A. Sonntag: "Verbesseter R–Sic Werkstoff Fuer Den Zyklischen . . . "CFI/BER. DKG 74 (1977), No. 4,pp. 199–203.

* cited by examiner

Primary Examiner—Michael Colaianni
(74) Attorney, Agent, or Firm—Michael J. Striker

(57) ABSTRACT

A simple and economical method is described for compacting or shrinking flat glass panes. The method ensures high temperature homogeneity in the glass. First, the glass panes are cleaned and then a stack of glass panes to be treated is assembled without applying a release agent to any of the glass panes. Then the stack of glass panes is placed between ceramic panels made of silicon-infiltrated silicon carbide and this stack together with the ceramic panels is subjected to a heat treatment in a radiation furnace at temperatures ranging from 300° C. to 900° C. The ceramic panels have a thermal conductivity, which, in the region of the heat treatment temperature, is at least 5 times as large as that of the glass panes. The ratio of the total thickness of the ceramic panels to the height of the glass stack should be at least $1/\lambda/40W/(mK)$, wherein $\lambda$ is the thermal conductivity of the ceramic panel at the temperatures of the heat treatment.

15 Claims, No Drawings

METHOD FOR COMPACTION OF FLAT GLASS PANES

BACKGROUND OF THE INVENTION

1. Field of the Invention

The invention relates to a method for compacting or shrinking flat glass panes, especially display glasses, in which on at least one panel at least one flat glass pane is subjected to a heat treatment in a furnace at a temperature ranging from 300° to 900° C.

2. Description of the Related Art

Structurally, glass is amorphous, this amorphous structure not being fixed but dependent on the prior thermal history. The amorphous structure can also change after the manufacturing process, if the glass product is subjected to a thermal stress. Associated with each change in the amorphous structure is a change in the density to higher or lower values, measured at room temperature. These structural changes and the corresponding changes in the density can be calculated at least approximately using known physical laws from the temperature-time curve of the thermal stress (George W. Scherer: Relaxation in Glass and Composites, John Wiley & Sons, Inc. (New York, Chichester, Brisbane, Toronto, Singapore), 1986, Library of Congress Catalog Card Number: 85-17871).

From the JP Abstract 08-301628 A, a thermal conduction furnace is known, in which a glass plate, which is to be heated, lies on a heating block, which is provided with an aluminum layer in order to ensure good thermal conductivity. Above the glass plate, a further heating block is disposed movably and pressed onto the glass plate. Since the heating elements are integrated into this heating block, the danger exists that, due to the different heat outputs, a different and, with that, harmful input of heat into the glass plate, which is to be treated, takes place.

The DE 3 422 347 A1 describes a method for leveling thin glasses, for which a stack of glass plates is formed, which lies on at least one layer of paper. Paper layers have also been provided between the individual glass plates. The lower layer of paper lies on a flat supporting plate, which may consist of graphite, ceramic, glass or metal. The coefficient of expansion of the supporting plate should vary in the same way as that of the thin glass, which is to be leveled, so that thick glass plates of the same material are preferred.

Aside from such leveling methods, which are carried out above the upper cooling point, there are so-called compaction methods.

During a heat treatment following the actual manufacturing process at temperatures ranging from the lower to the upper cooling point (these are the temperatures, at which the viscosity of the glass is $10^{14.5}$ dPas and $10^{13}$ dPas respectively), there is generally shrinkage of the material, which is strong at high temperatures and weak at low temperatures. It follows from the physical laws cited that the weak shrinkage at a low temperature is even weaker, if the glass previously was compacted at a higher temperature, preferably between the lower and the upper cooling points.

Flat glass, intended for the production of flat displays, generally must be compacted, so that there is no further significant shrinkage during the different temperature stresses in the course of the further manufacturing process of the display pane. If there were such further shrinkage, the different structures, applied in layers during the manufacture of the flat display, would no longer be aligned as desired.

Liquid crystal display screens (LCD's) constitute a significant proportion of the flat displays. The usual process temperatures during their manufacture are between 200° C. and 400° C. The maximum permissible shrinkage of the glass substrate during the manufacturing process depends on the technology employed. For the thin film transistor (TFT) based on amorphous silicon, the shrinkage must not exceed 10 ppm (T. Yukawa, K. Taruta, Y. Shigeno, Y. Ugai, S. Matsumoto, S. Aoki (1991): Recent progress of liquid crystal display devices, In: Science and Technology of new glasses. Eds.: S. Sakka & N. Soga, pages 71–82, Tokyo, 1991).

Flat plasma displays are also widespread. Their manufacturing process comprises, for instance, the mounting of electrodes, cross members, phosphorus and dielectric layers usually at temperatures ranging from 450° C., and 600° C. The shrinkage of the thin glasses, used as substrate, may not exceed 20 ppm during this process.

Immediately after the glass pane is produced, for example, by a drawing or floating process, the glass generally is not yet compacted sufficiently, so that a further temperature treatment (post-annealing) must be carried out.

For example, the shrinkage of an alkali-free glass, typical of glasses used for display applications (such as AF 45 of the Deutsche Spezialglas AG, Griinenplan) during a subsequent annealing for 1 hour at 450° C. is about 50 ppm if the glass has not previously been compacted. This shrinkage can be reduced to values less than 12 ppm by an appropriate temperature treatment. In the case of a glass with a low cooling point, (such as glass D263 of the Deutsche Spezialglas AG, Grünenplan), the shrinkage directly after the manufacturing process is even more than 300 ppm during annealing at 450° C. for 1 hour. This value can be reduced to less than 20 ppm by a suitable post-annealing.

The post-annealing is carried out in a batch or continuous furnace. For economic reasons, the glass panes, generally 10 to 20 panes with a thickness of the order of 1 mm, are combined into stacks. These stacks are placed onto a supporting panel and sometimes weighed down with a covering panel, for which purpose quartz plates, for example, are used.

The tendency of the stacked glass panels to adhere at higher temperatures, such as those between the lower and upper cooling point, creates difficulties. In order to avoid this adhesion of the panels, layers of inorganic powders are introduced as release agent (U.S. Pat. No. 5,073,181) between the glass panels. It is a disadvantage that the powder can affect the optical quality of the surface of the panel, if a certain particle size is exceeded.

Furthermore, the need to assure the best possible temperature homogeneity within the whole of the stack during the annealing creates difficulties. Any temperature inhomogeneity from pane to pane (that is, a vertical temperature inhomogeneity in the stack) means that, depending on the temperature program, the different panes pass through different temperature histories and, with that, have different compactions.

For a single pane, a vertical temperature gradient within the stack generally does not present a problem, since the height of the pane usually is small in relation to the height of the stack. It is different for a lateral temperature inhomogeneity. The latter means that, depending on the temperature program, the different sections of a pane pass through different temperature histories and, with that, have different compactions. For the individual pane, however, a lateral temperature inhomogeneity also means that, at the end of the annealing process, an internal stress develops in the pane, the relaxation of which during subsequent temperature stresses in turn can lead to local changes in volume. If there is a temperature gradient in the pane in the plane of the pane during the annealing, then this leads to a mismatching of the different sections of the pane during the temperature equalization at the end of the annealing process. This mismatching is compensated for by a mutual distortion of the different sections of the glass. If these tensions are relaxed during a subsequent temperature treatment, the different sections of the glass can expand or contract.

Such inhomogeneous volume expansion or shrinkage effects are a major problem for the display manufacturer, because the latter cannot compensate for them by an appropriate dimension of the masks during the subsequent coating processes.

The existence of a certain temperature inhomogeneity is unavoidable. During the heating, which necessarily is a part of the annealing process, heat must flow into the stack; during the cooling, which is also necessarily part of the annealing process, heat must flow out of the stack once again. Both processes also comprise an inner heat flow in the stack, which requires an internal temperature gradient as driving force. For geometric reasons (a typical value for the height of the stack is 2 cm; on the other hand, the lateral dimensions can be of the order of 1×1 m), it is preferable to have the heat flowing in and out predominantly in a direction perpendicular to the plane of the pane. In this direction, a relatively small temperature difference is sufficient in order to attain the same temperature gradient and, with that, the same heat flow, for which a very large temperature difference would be required in the lateral direction.

A large lateral temperature difference would have two disadvantageous effects (different compaction and stress effect). On the other hand, a vertical temperature difference has only one unfavorable effect, namely the different compaction. As homogeneously as possible a temperature distribution in the lateral direction therefore is desirable. The vertical temperature difference during heating and cooling should only be as large as necessary for the flow of heat for heating or cooling of the stack. During an isothermal phase, the vertical temperature difference should also be zero.

The technical realization of annealing with a large temperature homogeneity depends on the temperature range in question. For post-annealing of display glasses, these ranges typically are 500° C. to 700° C. (the upper and lower cooling points of D 263 are at 529° C. and 557° C. respectively, the upper and lower cooling points of AF 45 are at 627° C. and 663° C. respectively and, for special glasses, they can also be 300° C. to 900° C.).

If a high degree of temperature homogeneity is required, forced air furnaces, in which the air is heated to the desired furnace temperature and circulated in the furnace, are used.

In the case of heating or cooling, the air is made a little hotter or cooler than the outer surface of the stack, in order to produce a driving force for a heat flow into or out of the stack. This temperature difference must be of the same magnitude everywhere, so that locally different heating and cooling rates and, with that, temperature inhomogeneities are not produced by local differences in the heat flow.

For several reasons, forced air heating is not desirable. First of all, additional costs are associated with the ventilation. Secondly, portions of release agents are dissolved out of the spaces between the glass panes and, under certain circumstances, dirt particles are introduced instead. This is undesirable, especially in the case of display glasses, the further processing of which usually takes place in clean rooms. Accordingly, annealing without circulating air is desirable.

U.S. Pat. No. 5,597,395 discloses a method for the compaction, in which the glass panes, in a furnace at the annealing temperature, are exposed simultaneously to a pressure all around by means of a gas.

SUMMARY OF THE INVENTION

It is an object of the invention to make available a method for the compaction of flat glass panes, which is simpler and, with that, priced more advantageously and ensures good temperature homogeneity in the glass.

This objective is accomplished by a method wherein the heat treatment is carried out in a radiation furnace, in which the flat glass pane is disposed on at least one ceramic panel with a thermal conductivity which, in the thermal treatment temperature range, is at least 5 times as great as that of the glass pane, which is to be treated.

The heat-treatment temperature or the temperature range is selected according to the glass values of the glass plate, which is to be treated, the temperatures preferably lying between the upper and lower cooling points.

In comparison to a forced air furnace, the use of a radiation furnace is more economical, because there are no additional costs for ventilation, etc. Moreover, when release agents are used, they are not dissolved out of the spaces between the glass panes.

Previously, radiation furnaces were generally not used at temperatures ranging from 300° C. to 900° C., because the heat transfer by radiation generally is inadequate at this temperature range for overcoming the structurally induced unevennesses in the furnace, such as the different introduction of power by heaters of apparently the same construction, uneven insulation, etc. and for producing a good temperature homogeneity in the furnace space.

Furthermore, glass has a poor thermal conductivity, typically of 1 W/(mK), as a result of which the occurrence of temperature inhomogeneities in the glass is intensified.

It has turned out that these disadvantages of a radiation furnace can be compensated for by the fact that the at least one glass pane is disposed on at least one ceramic panel with a thermal conductivity which, in the temperature range in which the heat treatment is carried out, is at least 5 times as large as that of the glass pane, which is to be treated.

The advantage of such ceramic panels consists therein that the heat flow is taken over by them and distributed simultaneously over the large surface of the glass pane, so that temperature differences in the plane of the pane are compensated for. A rapid inflow of heat during heating and a rapid outflow of heat during cooling are further advantages.

It was not possible to achieve these advantages with the quartz panels previously customarily used, because the thermal conductivity of this material only approximately corresponds to that of the glass panes to be treated.

Preferably, a stack of flat glass panes is deposited on the ceramic panel and subjected to a thermal treatment. The temperature homogeneity in the glass can be improved further if the glass pane or the stack of glass panes is disposed between two such ceramic panels.

Advantageously, pore-free ceramic panels are used because such panels cannot take up any foreign materials, such as detergent residues or the like which, during the heat treatment, could have a negative effect on the surface of the glass panels to be treated.

Preferably, ceramic panels are employed, which advantageously consist of or contain SiC. These include, for example, panels of nitride-bound SiC and silicon-infiltrated SiC, the latter material being preferred particularly because of the absence of pores.

The use of these materials as kiln furniture admittedly is known from the ceramic industry, properties such as the high strength of components, high resistance to sudden changes in temperature and great dimensional stability (no creep under thermal stress) being utilized there (A. Sonntag: "Improved R-SiC Material for Cyclic Use at High Temperatures: Halsic-RX", cfi/Ber. DKG 74 (1977) No. 4, page 199). For example, plate holders for sharp firing and graining are offered (one source: AnnaWerk Keramische Betriebe, 96466 Rödental, Material "recrystallized sic").

However, in the state of the art, there are no indications that these ceramic materials are also suitable for use during the compaction of flat glass panes, because other properties of the ceramic material are in the foreground.

The use of ceramic materials has the advantage that, in comparison to a stack of glass panels, a lateral temperature difference in the furnace (that is, for example, between two opposite side walls) becomes clearly less apparent in the stack. This is surprisingly so when the heat transfer between the surfaces in the furnace, mutually irradiating one another, is low at the temperatures relevant here.

It has turned out that, due to the use of ceramic of high thermal conductivity, the lateral temperature gradient in the stack can be reduced by more than a half, when the height of the glass stack is adapted to the thickness of the two ceramic panels.

Preferably, the thickness of the ceramic panels used is such that the ratio of the total thickness of the ceramic panels to the height of the glass stack is at least $1/\lambda 40/W/(mK)$, $\lambda$ being the thermal conductivity of the ceramic material in the range of thermal treatment temperatures.

This state of affairs is illustrated by the following example.

Between two opposite sidewalls of the furnace, there is a temperature difference of, for example, 10°K. The ceramic panels are placed in the furnace so that a front face of a ceramic panel lies parallel to and opposite to each side wall of the furnace and both exchange radiation. The broad sides of the ceramic panels are insulated from the furnace. The average temperature in the furnace space is 500° C. The side walls of the furnace and the ceramic panels may have an emissivity of one. There is a net heat flow through the front ends of the ceramic panels. The heat flow density is about 100 W/(m²K)/ΔT', ΔT' being the temperature difference between the respective side wall of the furnace and the opposite front side of the ceramic panel. The furnace is symmetrical so that ΔT' is the same for the two sides.

The glass stack has an area of 0.5×0.5 m and a height of 0.01 m. Each of the ceramic disks has the same surface area and a height of 1 cm. The glass and the ceramic panels may equally have the emissivity of one. The heat flow through the front sides is then $1.5\ ^W/_K \times \Delta T'$. Because of the poor thermal conductivity of glass, typically 1 W/(mK), this heat flow is taken over predominantly by the ceramic panels. In these, the heat flow is equal to $0.8\ ^W/_K \times \Delta T''$. From the condition that the heat flow must be maintained and the further condition that the sum of all temperature differences on the way from one side wall to the opposite side wall must be 10°K, ΔT' is calculated to be 2.6°K, and ΔT" is calculated to be 4.8°K. Without the ceramic disks, the heat flowing through the front sides would have to be transported further by the glass itself. In the latter, the heat flow is equal to $0.005\ ^W/_K \times \Delta T'''$. From the condition that the heat flow, etc. must be maintained, ΔT' would be 0.033°K and ΔT" 9.934°K. Therefore, through the use of the ceramic of high thermal conductivity, it is possible to reduce the lateral temperature gradient in the stack by more than a half, when the stack height and the thickness of the two ceramic disks are matched to one another.

Preferably, the glass pane or the stack of glass panes is disposed between two panels of silicon-infiltrated SiC (SiSiC). If several ceramic panels are used between the glass stack and the furnace wall, the silicon-infiltrated SiC panel preferably faces the glass stack because the silicon-infiltrated silicon carbide has the advantage of not having a porosity, in which detergent residues, metallic dusts and the like, which react with the adjoining glass surface during the annealing and make these useless, can be deposited.

Preferably, the silicon-infiltrated SiC panels are subjected to a precision grinding to produce a roughness $R_{tm} \leq 10\ \mu m$ and preferably of $\leq \leq 1\ \mu m$. By these means, slippage of the glass on the silicon-infiltrated silicon carbide is prevented, which necessarily goes along with the compaction during the annealing, and the further slippage caused by the different coefficients of thermal expansion does not result in optically impairing effects.

The use of a release agent, such as that known from U.S. Pat. No. 5,073,181, has a lasting effect on the temperature homogeneity in the stack. The vertical thermal conductivity is a weighted average of the thermal conductivity of the glass and of the powder and typically has a value of 0.1 W/(mK). If the layers of powder have a thickness, for example, of 1/10 of the thickness of the glass pane, the weighted average is 0.5 W/(mK). The powder thus results in an increase in the temperature inhomogeneity in the stack. In order to improve the temperature homogeneity further, it has turned out surprisingly that the stack of glass panes can also be annealed without a release agent, if the panes previously are subjected to a chemical process. This chemical treatment preferably comprises several steps.

In the first step of the treatment process, the glass is immersed in an alkaline solution having a pH of more than 10. This is followed by a treatment with distilled water. Subsequently, a further step with preferably an acidic medium (pH<4) can follow, which may contain additional surfactants, as well as a renewed rinsing with distilled water. The last surface treatment consists of rinsing with distilled water, preferably in a cascade rinsing process. The distilled rinsing water preferably has been filtered to remove particles up to 1 μm in diameter. The specific resistance of the distilled rinsing water preferably is >1 Mohm, for example, 18 Mohm. In addition, there may be ultrasonic modules in the various baths. The temperatures advantageously are adjusted to values between 40° and 80° C. Subsequently, the panes are dried. For this purpose, a drying process is recommended, the capacity of which is regulated by the temperature and the circulated air in such a manner that, at the conclusion of the drying process, the pane has a surface, which is not moist and, in addition, there are no significant amounts of condensed residual moisture on the microscopic surface. In combination with a particle filtration of the air and measures to avoid static charges during the drying, the panes must be stacked after the drying process in such a manner that particle contamination is not introduced between the panes.

The inventive method is described in greater detail in the following by means of examples.

Preparation of the SiSiC

For the annealing, 540×420×6 mm³ SiSiC panels were used, which had been produced by the slip casting method with subsequent Si infiltration.

The surface was polished with a No. 200 grain SiSiC on a metal grinding disk, until a surface roughness of not more than 5 μm at a planarity of 60 μm over the diagonal was reached. After the polishing, the panels did not have any partially ground bubbles larger than 10 μm. After the polishing process, the panels were kept for 24 hours in a 6-molar hydrochloric acid solution and subsequently rinsed off.

Chemical Treatment of AF45 Glass

In order to anneal AF45 glass without a release agent, the glass was converted to a thickness of 1.1 mm on a format of 320×320 mm². For the treatment process, the glass was held by Teflon ribs at the sides and at the bottom in a stainless steel vessel. The distance was selected so that the glass was not under tension. The glass was treated in a cleaning facility, the first basin of which was filled with a bath having a pH of 12. The glass was left in the basin at a temperature of 50° C. for 5 minutes. Subsequently, the basket with the glass was brought into a rinsing basin with distilled water and left there for about 3 minutes, until the conductivity was less than 1 μS, so that it was possible to transport the basket into the acid basin. The pH was adjusted to 2, and the glass was left in the basin at a temperature of 50° C. for 5 minutes.

Subsequently, the basket was brought once again into a rinsing basin with distilled water and rinsed there once more until a conductivity of 1 μS was obtained. The final cleaning was carried out in very pure water, which had a conductivity of up to 0.5 μS and was prepared by reverse osmosis and an electric deionization method. In this basin, there is a 10 μm particle filter.

During the treatment, the basket was moved up and down continually by 6 cm in all basins. Ultrasound was used in all basins, with the exception of the rinsing basin. The same treatment was also carried out with 1.9 mm thick glass. Drying took place at 200° C. for 20 minutes.

Chemical Treatment of D263 Glass

D263 glass was converted to a thickness of 1.1 mm on a format of 340×360 mm². For the treatment process, the glass was held vertically in a stainless steel vessel at the sides and bottom by slots in a Teflon tape. The glass was treated in an automatic cleaning device, which stood in a clean room. For this purpose, the basket was placed on a rest and transported to the first basin.

The bath had a pH of 12 and the glass was left in the basin for 5 minutes at a temperature of 60° C. Subsequently, the basket was brought into a rinsing basin with distilled water, left there for 5 minutes and then transported into the acid basin. The pH was adjusted to 2 and the glass was left in the basin for 5 minutes at a temperature of 60° C.

Subsequently, the basket was brought once again into a rinsing basin with distilled water and left there for 5 minutes. The glass was cleaned in a cascade basin (3-fold, 5 minutes each) until the conductivity was measured to be 0.05 μS. A 5 μm particle filtration was integrated in this basin. The temperature of the distilled water in the rinsing basin and in the cascade basin was 60° C. In the last basin, the basket was raised slowly at the rate of 1 cm per second with a lifting-out mechanism. Drying took place in a drying module with a high performance, high efficiency, submicron, particulate air filter, clean room class 100, for 8 minutes at a temperature of 120° C.

Subsequently, the panes were packaged in the clean room and transported safeguarded against vibration.

Annealing

For stacking, the panes were positioned in a box (flow box), constantly flushed with filtered air. The SiSiC panels were cleaned with ethanol and, after that, also placed in the flow box next to the panes. The panes were handled at the edge with plastic gloves and 10 panes were stacked on top of one another on an SiSiC panel (polished side upward). Finally, a polished SiSiC panel was placed with the polished side down on the top panel. The "sandwich", so assembled, was positioned in a radiation furnace, which made good temperature homogeneity possible by means of five control zones. For checking purposes, several S thermocouples (Pt/PtRh10; thermocouples, in which the thermal voltage is produced by the metal pair of platinum (pure)/platinum with 10% rhodium) were positioned in the glass stack. The temperature inhomogeneity, measured there in the Z direction and in the X and Y directions, did not exceed a value of ±3° K during the annealing. Starting out from room temperature, the glass was heated at a rate of 300°/hour to a $T_{max}$. After a residence time $T_{hold}$, the glass was then cooled to room temperature according to a cooling curve, optimized with respect to structure and stress relaxation.

Shrinkage During a Later Temperature Treatment (Compaction)

For measuring the compaction, the disks were provided with a grid of scored marking crosses at a distance of 100 mm before the later heat treatment. The distances between all adjacent markings were measured with a coordinates measuring machine before and after the later heat treatment. The temperature treatment for D263 was 1 hour, 450° C., heating rate and cooling rate of 5° K/min. The temperature treatment for AF 45 was 1 hour, 590° C., heating rate and cooling rate of 6° K/min. From each stack, the compaction of three panes (one from the center, the second from the top and the second from the bottom) was measured. The temperature treatment was carried out in the same furnace and under the same temperature homogeneity boundary conditions as above.

The following results were obtained:

TABLE

Δl/l (ppm) for D 263 and AF 45 glasses after an additional temperature treatment, each measured on three glass panes

| Type of Glass | Pane No. | | |
|---|---|---|---|
| | 1 | 2 | 3 |
| D 263 | −1 ± 3 | 1 ± 2 | 3 ± 3 |
| AF 45 | 0 ± 3 | 2 ± 5 | 1 ± 4 |

What is claimed is:

1. A method of compacting flat glass panes, said method comprising the steps of:

a) cleaning at least one flat glass pane to be compacted wherein said cleaning includes a chemical treatment for cleaning said flat glass panes to be compacted, said chemical treatment comprising the steps of: a) immersing the flat glass panes in an alkaline solution having a pH of more than 10; b) treating said flat glass panes with distilled water; c) treating said flat glass panes with an acidic medium having a pH of less than 4, said acidic medium optionally containing surfactants; d) rinsing said flat glass pane again with distilled water; and e) drying the flat glass panes;

b) after the cleaning of step a), placing said at least one flat glass pane to be compacted on at least one ceramic panel; and then c) performing a heat treatment of said at least one flat glass pane together with said at least one ceramic panel in a radiation furnace at temperatures of from 300° C.

to 900° C. without a release agent applied to said at least one flat glass pane;

wherein said at least one ceramic panel has a thermal conductivity which is at least five times that of said at least one flat glass pane in a temperature range in which said at least one flat glass pane is subjected to said heat treatment.

2. A method of compacting flat glass panes, said method comprising the steps of:
   a) cleaning flat glass panes to be compacted wherein said cleaning includes a chemical treatment for cleaning said flat glass panes to be compacted, said chemical treatment comprising the steps of: a) immersing the flat glass panes in an alkaline solution having a pH of more than 10; b) treating said flat glass panes with distilled water; c) treating said flat glass panes with an acidic medium having a pH of less than 4, said acidic medium optionally containing surfactants; d) rinsing said flat glass pane again with distilled water; and e) drying the flat glass panes;
   b) after the cleaning of step a), placing a stack of said flat glass panes to be compacted between ceramic panels; and then
   c) performing a heat treatment of said stack of said flat glass panes together with said ceramic panels in a radiation furnace at temperatures of from 300° C. to 900° C. without a release agent applied to any of said flat glass panes;
   wherein said ceramic panels have a thermal conductivity which is at least five times that of said flat glass panes in a temperature range in which said flat glass panes are subjected to said heat treatment.

3. The method as defined in claim 1, wherein said at least one ceramic panel is pore-free.

4. The method as defined in claim 2, wherein each of said ceramic panels is pore-free.

5. The method as defined in claim 1, wherein said at least one ceramic panel comprises SiC.

6. The method as defined in claim 2, wherein each of said ceramic panels comprises SiC.

7. The method as defined in claim 2, wherein said ceramic panels each have a thickness such that a ratio of a total thickness of said ceramic panels to a height of said stack of said glass panes is at least $1/\lambda/40W/(mK)$, wherein $\lambda$ is the thermal conductivity of the ceramic panels in said temperature range.

8. The method as defined in claim 2, further comprising filtering the distilled water used for said rinsing prior to said rinsing in order to remove particles from the distilled water used for the rinsing having particle sizes down to 1 $\mu$m.

9. The method as defined in claim 2, wherein the distilled water has a specific resistance of greater than 1 Mohm.

10. The method as defined in claim 2, wherein said alkaline solution, said distilled water and said acidic medium are at temperatures of between 40° C. and 80° C. during said chemical treatment.

11. A method of compacting flat glass panes, said method comprising the steps of:
   a) cleaning flat glass panes to be compacted wherein said cleaning includes a chemical treatment for cleaning said flat glass panes to be compacted, said chemical treatment comprising the steps of: a) immersing the flat glass panes in an alkaline solution having a pH of more than 10; b) treating said flat glass panes with distilled water; c) treating said flat glass panes with an acidic medium having a pH of less than 4, said acidic medium optionally containing surfactants; d) rinsing said flat glass pane again with distilled water; and e) drying the flat glass panes;
   b) after the cleaning of step a), placing a stack of said flat glass panes to be compacted between ceramic panels; and then
   c) performing a heat treatment of said stack of said flat glass panes together with said ceramic panels in a radiation furnace at temperatures of from 300° C. to 900° C. without a release agent applied to any of said flat glass panes;
   wherein said ceramic panels consist of silicon-infiltrated silicon carbide and have a thermal conductivity which is at least five times that of said flat glass panes in a temperature range in which said flat glass panes are subjected to said heat treatment.

12. The method as defined in claim 11, further comprising roughening said ceramic panels by precision grinding so that said ceramic panels have a roughness less than or equal to 10 $\mu$m.

13. The method as defined in claim 12, wherein said roughness is less than or equal to 1 $\mu$m.

14. The method as defined in claim 11, wherein said ceramic panels each have a thickness such that a ratio of a total thickness of said ceramic panels to a height of said stack of said glass panes is at least $1/\lambda/40W/(mK)$, wherein $\lambda$ is the thermal conductivity of the ceramic panels in said temperature range.

15. The method as defined in claim 11, wherein said alkaline solution, said distilled water and said acidic medium are at temperatures of between 40° C. and 80° C. during said chemical treatment.

\* \* \* \* \*